Aug. 23, 1938.                D. SANTINI ET AL                2,128,056
                              REGULATING APPARATUS
                              Filed July 31, 1936            3 Sheets-Sheet 1
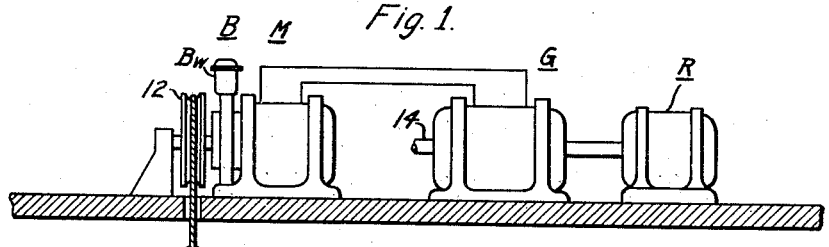
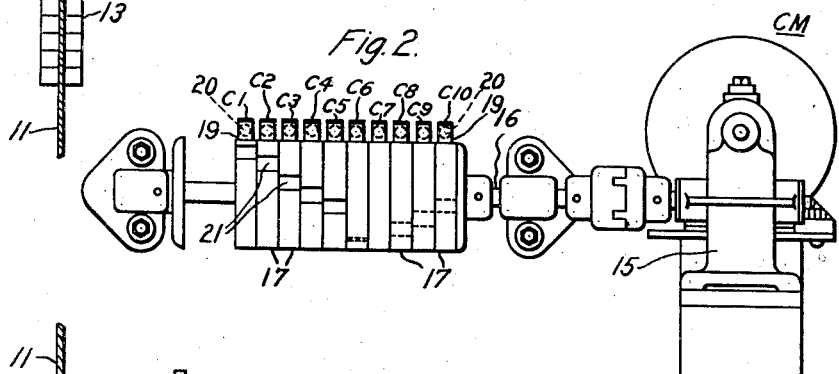
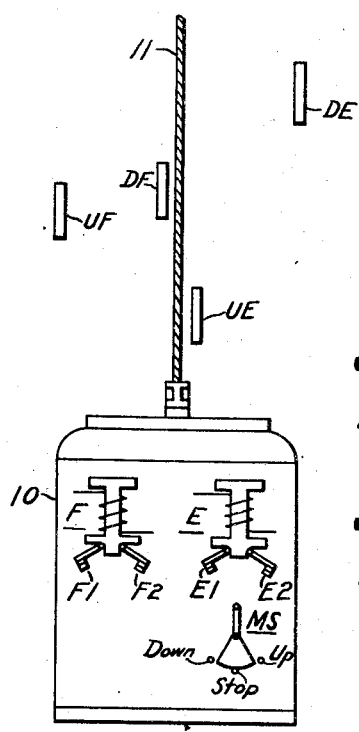
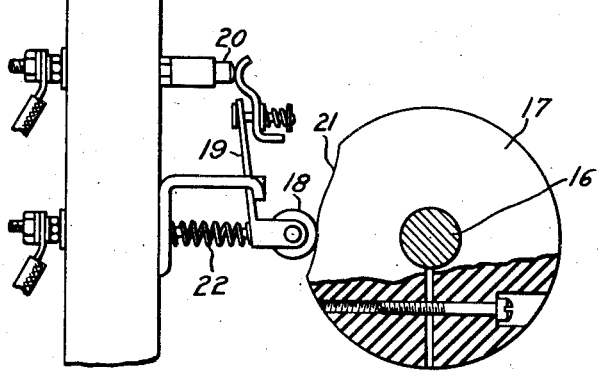
WITNESSES:
INVENTORS
Danilo Santini and
Kenneth M. White.
BY
ATTORNEY Aug. 23, 1938.                D. SANTINI ET AL                2,128,056
                              REGULATING APPARATUS
                              Filed July 31, 1936            3 Sheets-Sheet 2

WITNESSES:

INVENTORS
Danilo Santini and
Kenneth M. White,
BY
ATTORNEY

Aug. 23, 1938.                D. SANTINI ET AL                2,128,056
                              REGULATING APPARATUS
                              Filed July 31, 1936          3 Sheets-Sheet 3
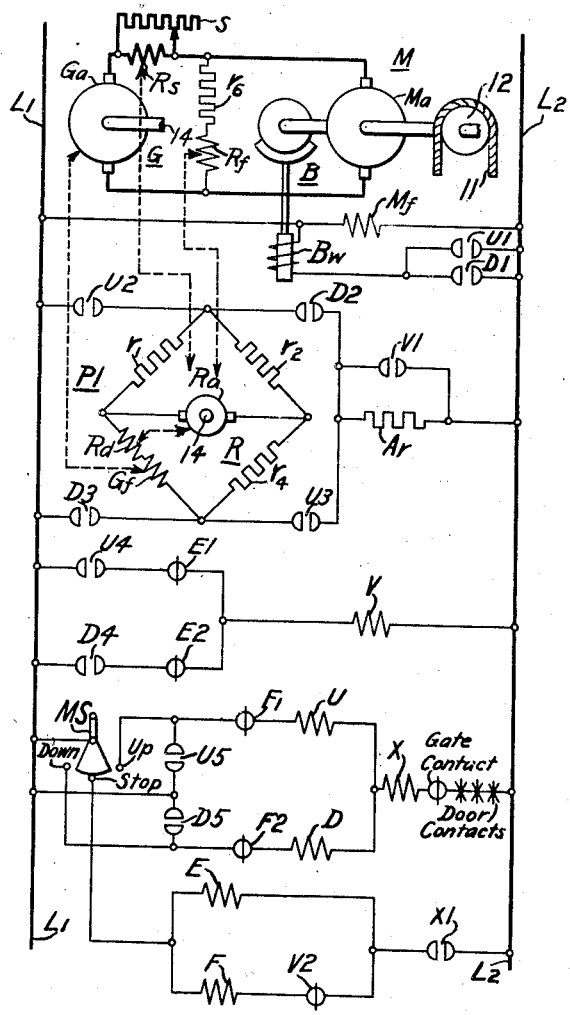
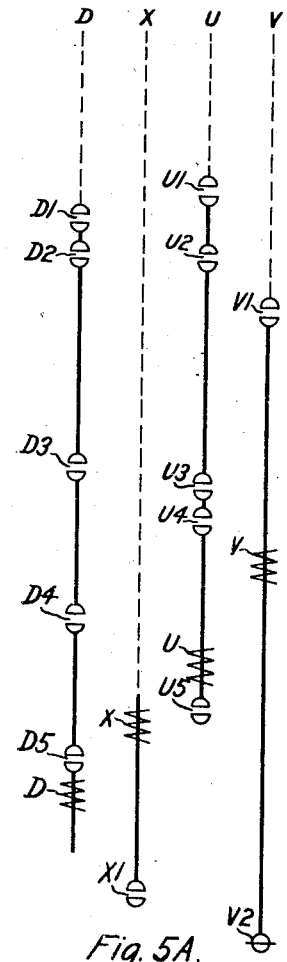
Fig. 5.                                                    Fig. 5A.
Fig. 6.    Fig. 7.    Fig. 8.                    Fig. 9.
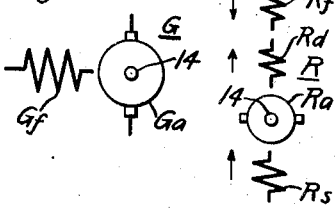
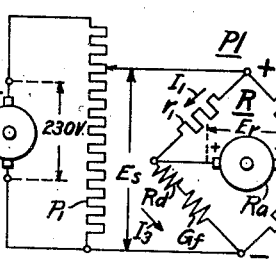
WITNESSES:                                        INVENTORS
                                              Danilo Santini and
                                              Kenneth M. White,
                                              BY
                                                  ATTORNEY Patented Aug. 23, 1938

2,128,056

UNITED STATES PATENT OFFICE 2,128,056

REGULATING APPARATUS

Danilo Santini, Chicago, Ill., and Kenneth Martin White, Tenafly, N. J., assignors to Westinghouse Electric Elevator Company, Chicago, Ill., a corporation of Illinois Application July 31, 1936, Serial No. 93,618

17 Claims. (Cl. 171—119)

This application is a continuation-in-part of our copending application, Serial No. 38,770, filed August 31, 1935 and assigned to the Westinghouse Electric Elevator Company. The present application discloses an invention, relating to regulating apparatus, which has been divided from the parent application, and also discloses a novel relationship of resistances in a control system of the type disclosed in the above-mentioned parent application.

Our invention relates to regulating apparatus and particularly to such apparatus for regulating a translating device or machine so that an operating characteristic, such as speed, voltage or torque, is independently controlled in accordance with a plurality of separate regulating variables. Although the invention, in the broader aspects, is applicable to many forms of apparatus, it will be described particularly in connection with a motor control system of the variable voltage type, in which the motor speed is controlled in accordance with two regulating variables, one such regulating variable being motor load, and the other regulating variable being controller position or controller setting. In such a system, regulation of the motor speed involves regulation of the voltage of the generator associated therewith, so that the application of the invention for the control of generator voltage generally will be obvious.

In the described embodiment of the invention, our regulating apparatus operates to regulate the speed of the motor so as to maintain the latter independent of motor load, and also allows the regulated motor speed to be fixed at any of a number of values determined by controller position or setting.

We are aware of many regulating systems of the prior art, applied to variable voltage motor control apparatus, in which the motor speed was regulated in accordance with motor load, and also in accordance with controller position or setting. However, in all such systems of which we are aware, the two regulating operations could not be completely separated, so that the operation of varying the controller setting had no effect upon the operation of counteracting the effect of load, and the operation of counteracting the effect of load had no effect upon the value of speed fixed by the controller.

In controlling the operation of an elevator car by means of a variable-voltage or Ward-Leonard system, a motor is provided which is arranged to be mechanically connected to the elevator car by cables to effect movement of the car in either direction. Ordinarily, the motor is provided with a separately excited field winding and the desired direction of movement of the car is effected by reversing the polarity of voltage applied to its armature. The motor is arranged to be energized from a generator which may be provided with a series field winding to compensate for the IR drop in its armature circuit, in the armature circuit of the motor, and in the leads interconnecting the armatures. The generator is provided with a separately excited main field winding, the current through which is arranged to be controlled and reversed in order to operate the motor and the load attached thereto, for example the elevator car, at various speeds in either direction of travel.

The excitation of the main field winding of the generator may be controlled by means of a rheostat or the combination of various resistors and suitable control devices for inserting various steps of resistance in circuit with the main field winding. For each step of the controller which alters the current flowing through the main field winding of the generator there is a particular speed of operation of the motor which is desired. Any departure in speed from this desired value introduces undesirable operating conditions in the functioning of the system.

If it were possible to maintain all of the conditions in a control system of the Ward-Leonard type absolutely constant, it would then be possible to obtain an exact relationship between the speed of the motor and the setting of the controller which regulates the flow of current through the main field winding of the generator. Due to the physical constants and characteristics of the system, however, it is not possible to achieve such a result without the use of a compensating system of some type. This is particularly true when the Ward-Leonard control system is employed to control the movement of an elevator car in a hatchway. In such case, additional variables enter into the functioning of the system which make it difficult to maintain the speed of the elevator car under all conditions at predetermined values corresponding to the various settings of the controller for the main field winding of the generator.

With regard to the elevator car itself, it operates under two extremes of conditions, that is, full load up and full load down. When the elevator car is operated with full load in the up direction, the motor has applied thereto maximum power from the generator. Under these conditions, it is necessary for the load to be lifted against the force of gravity. When the elevator car is operating in the down direction under full load, the functioning of the motor is reversed and it operates as a generator, causing the generator to function as a motor and to return power to the power source in the event that the generator is arranged to be driven by means of a motor such as an alternating-current motor. A further variable factor which enters into the functioning of the elevator car is the friction which it encounters in its movement along the hatchway. When the elevator car is first installed, this friction may be relatively great but it lessens in effect as the car is used over a period of time.

In the motor which is connected to drive the elevator car, various changes in its operating conditions occur which affect its speed for each setting of the controller for the main field winding of the generator. The variations in the resistance losses of the motor, due to changes in temperature, constitute one item of variation. These changes may be due, in part, to changes in temperature caused by changes in the weather and, in part, by the loading of the motor. That is, in the winter when it is cold, the resistance losses of the motor will be somewhat less than they are in the summer. Likewise, when the system is initiated in operation after having been shut down for a period, the resistance losses are less than they are when the system has been operating and the motor has become heated to operating temperature. Also depending upon the load carried by the motor, it will reach different operating temperatures. A further variable in the operation of the motor is the change in resistance of its main field winding. Its resistance is changed in accordance with the temperature of the motor, and in accordance therewith, the current flowing therethrough is somewhat altered to change the point on the magnetization curve of the motor at which it operates.

There are many conditions which affect the functioning of the generator that is connected to supply current to the motor, thereby causing its power output to vary widely for the same setting of the controller for the main field winding under like conditions of load. Since it operates under widely varying conditions, these results are particularly accentuated. In order to reverse the direction of rotation of the motor, the current flowing through the main field winding of the generator is reversed. Depending upon the degree of reversal, there is a change in the residual magnetism of the main poles, which, to a certain extent, will alter the output of the generator for the same setting of the controller and load applied to the motor. Furthermore, the change in residual magnetism of the interpoles of the generator under these widely varying conditions also, to a certain extent, introduces another variable factor. The resistance of the main field winding of the generator varies with temperature. As a result, for the same setting of the controller, there may be different values of current flowing through it depending upon its temperature.

The condition of the commutator and brushes of the generator is another important variable factor which affects the operation of the generator. When the generator is first installed, or the commutator has been reground, the commutator is in a somewhat roughened condition, thereby causing the contact resistance between it and the brushes to vary. As the generator goes into operation, the commutator becomes polished and the contact resistance of the brushes correspondingly varies, although it may reach a substantially constant value after being in operation over a considerable period. Under certain conditions, the commutator becomes grooved or roughened, due to sand or other debris coming into contact with it and being carried underneath the brushes. When the system is subjected to heavy overloads, the brush-holders tend to change their position due to the increase in temperature thereof caused by the overload. There is, then, a tendency for the brushes to be slightly shifted and as a result, a cumulative or differential compounding effect may be present, depending on the direction of shift, which introduces another variable factor. There is also some change in the contact drop across the faces of the brushes and through the brushes, due to current flow therethrough. This introduces still another variable factor.

In the circuit connecting the armatures of the motor and generator, it is necessary to introduce joints between the conductors. The contact resistance of these joints varies to some extent with the temperature caused by the weather and by the current flowing therethrough. As a result, there is some change in the resistance of the load circuit under these varying conditions.

Since all of the foregoing variable characteristics enter into the operation of a Ward-Leonard control system employed for operating an elevator car in a hatchway, it has been necessary in the past to make certain compromises in its functioning and to permit certain variations in the speed of the elevator car from the desired speeds. It has not been possible heretofore to operate the elevator car in the hatchway at speeds corresponding to the setting of the controller of the main field winding of the generator, regardless of the load and operating conditions of the system. As the system goes into service it has been necessary in the past to continually make various adjustments in order to compensate for factors which change from time to time. As a result, the maintenance expense has been considerable and it has been necessary to provide a control system which is adjustable over a comparatively wide range, in order to permit the necessary adjustments that were required to be made from time to time.

It is, accordingly, an object of our invention to provide a novel regulating system for regulating a machine so that an operating characteristic, such as speed, voltage or torque, is independently controlled in accordance with a plurality of separate regulating variables.

A further and more specific object of our invention is to provide a novel regulating system for controlling the speed of a motor independently in accordance with load variables so as to eliminate the effect of load, and in accordance with the position or setting of a controller.

Other objects of our invention will become evident from the following detailed description, taken in conjunction with the accompanying drawings, in which:

Figure 1 illustrates diagrammatically the arrangement of an elevator car in a hatchway;

Fig. 2 is a view, in side elevation, showing the construction of a controller used for varying the resistance connected in circuit with the main field winding of the generator;

Fig. 3 is a view, partly in side elevation and partly in section, of a typical arrangement of the contact members of the controller shown in Fig. 2;

Fig. 5 illustrates diagrammatically another system in which our invention may be employed;

Fig. 5A illustrates the physical arrangement of certain of the operating windings and contact members of the relays and switches illustrated in Fig. 5;

Fig. 6 illustrates schematically the arrangement of the generator armature and main field winding;

Fig. 7 illustrates schematically the arrangement of the regulator-generator armature and its field windings; and Figs. 8 and 9 illustrate diagrammatically the arrangement of certain of the control circuits for the purpose of analysis and description of our invention.

Figure 4:
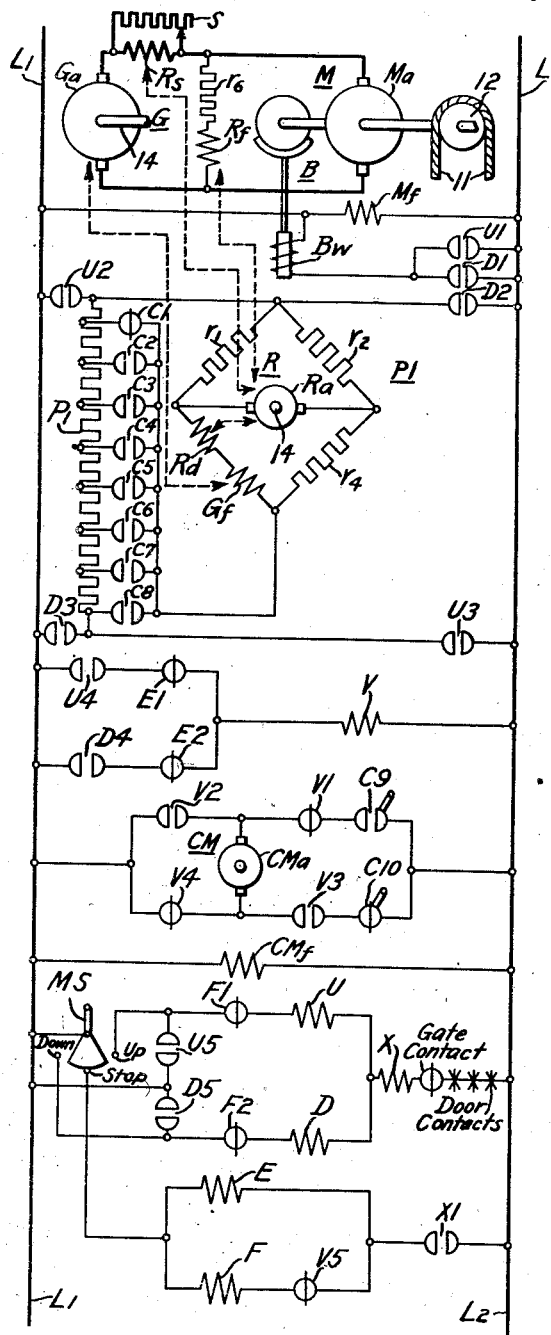
Fig. 4 illustrates diagrammatically one modification of my invention.
Figure 4A:
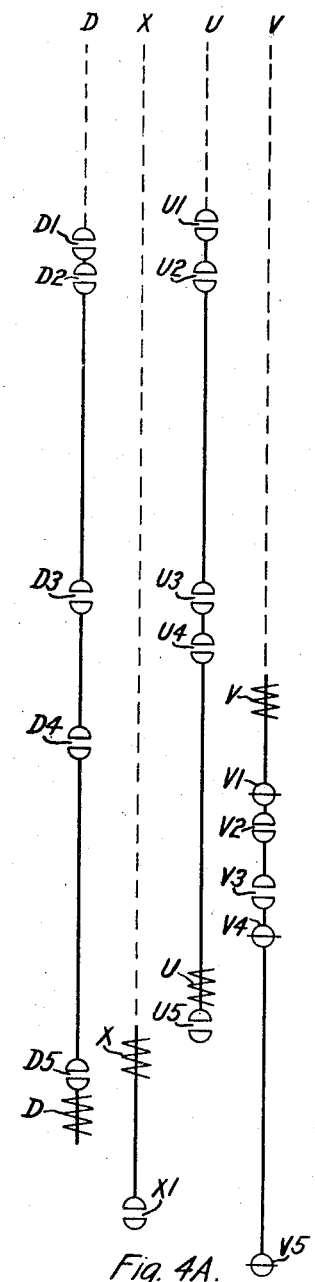
Fig. 4A shows the relationship between certain of the various operating windings and contact members of the relays and switches illustrated in Fig. 4.

In order to practice our invention, a Ward-Leonard control system is provided in which the motor is mechanically coupled, as set forth hereinbefore, to operate the elevator car in the hatchway. The motor is provided with a separately excited field winding which is arranged to be energized in a single direction only. A generator is provided having its armature connected to the armature of the motor. The control of the speed of the motor, and consequently, of the elevator car, as well as the direction thereof, is effected by varying the amount and direction of the excitation of the main field winding of the generator. This control may be effected in a few or many steps, depending upon the type of operation which is desired.

In order to maintain the speed of the motor at various constant values corresponding to various settings of the controller used for controlling the current flowing through the main field winding of the generator, a regulator-generator is provided which is arranged to measure the speed and load of the motor and the current flowing through the main field winding of the generator. The armature of the regulator-generator is arranged to be connected in series circuit relation with the generator field winding so that the voltage generated in the armature in response to the speed and load of the motor and the current flowing through the generator field winding will cause a current to flow through the main generator field winding, which will be a function of the departure of the motor speed from a predetermined value corresponding to the particular setting of the controller of the main field winding. Under certain load and operating conditions, no voltage will be generated in the armature of the regulator-generator since under these conditions, the speed of the motor corresponds to the setting of the controller. For all other conditions, however, a voltage will be generated in the armature of the regulator-generator in such direction and value as to cause the required current to flow through the main field winding of the generator to operate the motor at the desired speed.

In order to measure the speed and load applied to the motor, the regulator-generator is provided with a series field winding through which all or a portion of the current from the generator flows. The regulator-generator is also provided with a main field winding which is connected to be responsive to the voltage applied to the motor. These two field windings are differentially related so that the resulting flux is a function of the speed of the motor, as measured by its counter E. M. F., that is, the flux generated by the series field winding is proportional to the IR drop of the motor armature, and the flux generated by the main field winding of the regulator-generator is proportional to the voltage impressed across the terminals of the armature of the motor. Thus, the resulting flux due to the differential relationship between the two field windings, is a function of the counter E. M. F. of the motor. Since this flux results from the combined action of the current flowing through the motor armature and the voltage applied thereto, it is also a function of the load carried by the motor. The voltage which is generated in the armature of the regulator-generator due to this resulting flux, is then a function of the speed of the motor and the load carried thereby.

It is desirable that any change caused by the voltage generated in the regulator-armature and affecting the current flowing through the main field winding of the generator be immediately reflected in the voltage generated in the armature of the regulator-generator. Such action is desired in order to prevent hunting of the system. As soon as a voltage appears in the armature of the regulator-generator, indicating that the speed of the motor has departed from the desired speed, a change in the flow of current through the main field winding of the generator takes place in such direction as to tend to restore the speed of the motor to the desired speed. If some means is not provided for immediately effecting a corresponding change in the corrective voltage generated in the armature of the regulator-generator the resulting change in the fluxes of the series and main field windings of the regulator-generator in response to the corrective effect, will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field winding of the generator, a differential field winding is provided in the regulator-generator, and is connected in series circuit relation with the main field winding of the generator. Thus, any change in current which flows through the main generator field winding is immediately reflected in the voltage which is generated by the armature of the regulator-generator. It is then unnecessary to await the correction in the speed of the motor, as reflected in the change in the fluxes generated by the series and main field windings of the regulator-generator to correspondingly affect the voltage generated by the armature of the regulator-generator. The differential field winding of the regulator-generator is arranged to generate a flux in the same direction as the flux generated by the series field winding of the regulator-generator and, therefore, it opposes or is differentially related to the flux which is generated by the main field winding of the regulator-generator. There is always, then, a certain relationship between the speed and load of the motor and the corrective effect caused thereby in altering the flow of current through the main field winding of the generator. As a result, the system is free from hunting and the speed of the motor is maintained at predetermined values corresponding to various settings of the controller regardless of the many variable conditions which would otherwise affect the speed and cause it to change from the desired values.

As has been stated hereinbefore, it is desirable to effect a corrective action in the current flowing through the main field winding of the generator by means of the regulator-generator, without altering the current flow through the main field winding from the controller. It is then possible to maintain a precise relationship between the speed of the motor and the corresponding movement of the elevator car and the various settings of the controller, regardless of the load or other variable conditions which affect the operation of the motor.

We have discovered that a Wheatstone bridge circuit may be employed to effect the desired independent control of the current flowing through the main field winding of the generator. A balanced Wheatstone bridge circuit is provided in which the differential field winding and the main generator field winding are connected in series circuit relation and form a part or all of one of the branches. The armature of the regulator-generator is connected across one pair of opposite terminals of the Wheatstone bridge circuit while the remaining pair of terminals is connected through the controller to the independent control source. With such an arrangement, it is possible to vary the current flowing through the branch of the bridge containing the main field winding of the generator by means of the controller, independently of the current flow therethrough from the armature of the regulator-generator, and vice versa. In order to show that this relationship exists, a detailed mathematical analysis of this system will be set forth hereinafter.

Referring now particularly to Fig. 1 of the drawings, the reference character 10 designates, generally, an elevator car which may be supported in a hatchway or shaft by means of a cable 11 which is passed over a sheave 12 and balanced by suitable counterweights 13. The elevator car 10 is provided with a slowdown inductor relay E and a landing inductor relay F. The slowdown inductor relay E is provided with normally closed contact members E1 and E2 while the landing inductor relay F is provided with normally closed contact members F1 and F2. When the operating winding of the slowdown inductor relay E is energized, no action takes place until the contact members E1 or E2 come into proximity, respectively, with the inductor plates UE and DE, depending upon the direction of travel of the elevator car. Assuming that the elevator car 10 is traveling in the up direction, and that the operating winding of the slowdown inductor relay E is energized, the contact members E1 will be opened as soon as they are moved into proximity to the inductor plate UE. A resulting control function then takes place which will be set forth hereinafter. The contact members F1 and F2 of the landing inductor relay F are also opened when they come into proximity, respectively, to the inductor plates UF and DF. The elevator car 10 is also provided with a master switch MS having three positions, the extreme outer positions corresponding to up and down movement of the car, and the central position to a position to stop the car.

In order to operate elevator car 10 in the hatchway, a Ward-Leonard control system is provided which comprises a motor M that is arranged to be mechanically coupled, as illustrated, to the sheave 12. As shown in Figs. 4 and 5 of the drawings, the motor M comprises an armature Ma and a main field winding Mf, the latter being arranged to be separately excited from normally energized conductors L1 and L2. A brake B is provided having a brake-releasing winding Bw for releasing it on energization of the motor M.

The motor M is arranged to be energized by means of a generator G having, as shown in Figs. 4, 5 and 6, an armature Ga and a main field winding Gf. The armature Ga of the generator G is arranged to be mounted on a shaft 14 which may be driven by any suitable motive means, such as an induction motor (not shown), that may be connected to an alternating-current source of supply.

In order to control the functioning of the system, a regulator-generator R is provided having an armature Ra which may be mounted on the shaft 14. As shown in Fig. 7 of the drawings, the regulator-generator R is provided with a shunt field winding Rf, differential field winding Rd and a series field winding Rs. As indicated by the arrows, the shunt field winding Rf is arranged to generate a flux in a direction opposite to the direction of the fluxes generated by the differential field winding Rd and the series field winding Rs of the regulator-generator. The particular connections for the various field windings and the armature of the regulator-generator in the control systems are illustrated in Figs. 4 and 5 of the drawings, and they will be set forth in detail hereinafter.

In response to the operation of the master switch MS, up or down reversing switches U and D are operated. On the operation of either of the up or down switches, an auxiliary switch X is operated to complete a circuit for energizing the operating windings of the inductor relays E and F.

As soon as either the up or the down switch U or D is operated, a potentiometer P1 is connected across the conductors L1 and L2. The current flowing through the potentiometer P1 is in one direction when the up reversing switch U is energized, and in a reverse direction when the down reversing switch D is energized.

In order to accelerate the motor M, the current flowing through the main generator field winding Gf is increased by increasing the voltage applied thereto from the potentiometer P1. This voltage is gradually increased by the successive closing and opening of contact members C2 through C7, which as shown in Figs. 2 and 3 of the drawings, are arranged to be successively operated by means of a control motor CM. The control motor CM is arranged to operate through a reduction gearing mechanism 15 to rotate a shaft 16 on which a series of cams 17, composed of insulating material, is mounted. As shown more clearly in Fig. 3 of the drawings, a cam 17 is arranged to engage a roller 18 on the periphery thereof and to normally hold a movable contact member 19 out of engagement with a fixed contact member 20. The cam 17 is provided with a recessed portion 21 which is arranged to permit the roller 18 to move under the influence of a biasing spring 22, so that the movable contact member 19 is permitted to engage the fixed contact member 20. It will be understood that the cams 17 may be positioned on the shaft 16 in any desired relative positions to effect the sequential opening and closing of the contact members C1 through C8, as may be desired. In order to stop the operation of the control motor CM after it has reached its limit of travel, contact members C9 and C10 are provided. The contact members C10 are arranged to remain in the closed position until the control motor has reached its limit of travel after being initially energized. At this time contact members C10 are opened to terminate further motion of the control motor CM in this direction, contact members C9 having been closed as soon as the control motor CM was energized.

The contact members C9 are arranged to remain in the closed position until the control motor CM has been restored to the initial position, at which time they are opened. It will be understood that the cams 17, associated with these contact members, may be suitably arranged to effect this desired operation. As illustrated in Fig. 4 of the drawings, the control motor CM is provided with an armature CMa and a separately excited field winding CMf. The direction of rotation of the armature CMa is effected by reversing the polarity of the voltage applied thereto from the conductors L1 and L2 by means of a speed relay V.

It is desirable to independently control the flow of current through the main field winding Gf of the generator from two sources, one of the sources comprising the energized conductors L1 and L2 across which the potentiometer P1 is connected, and the other source comprising the armature Ra of the regulator-generator. For this purpose the Wheatstone bridge circuit is employed, comprising the customary four branches, three of which may be resistors $r_1$, $r_2$ and $r_4$, the remaining branch comprising the differential field winding Rd of the regulator-generator and the main field winding Gf of the generator. The armature Ra of the regulator-generator is connected across a pair of opposite terminals of the bridge circuit while the remaining pair of terminals is connected through the potentiometer P1 to the energized conductors L1 and L2. The series field winding Rs of the regulator-generator is arranged to be connected, as illustrated, in the circuit connecting the armatures Ga and Ma of the generator and motor, respectively. A shunt S may be provided for adjusting the flow of current through the series field winding Rs. The shunt field winding Rf of the regulator-generator is connected through a resistor $r_6$ across the terminals of the motor armature Ma. The resistor $r_6$ is employed in order to reduce the heat loss in the shunt field winding Rf, and consequently, the effect of a change in its resistance due to temperature rise, to a minimum.

In order to permit an analysis of the Wheatstone bridge circuit and its functioning in conjunction with the regulator-generator R, the circuits in Figs. 8 and 9 are shown. The voltage $E_s$ represents an independent control voltage which may be obtained from the potentiometer P1. The four branches of the bridge are identified by the reference characters $r_1$, $r_2$, $r_3$ and $r_4$; the resistance $r_3$ corresponds to the sum of resistances of the field windings Rd and Gf. The voltage $E_R$ is that which is obtained from the armature Ra of the regulator-generator R in response to the combined action of the series field winding Rs, shunt field winding Rf and the differential field winding Rd. The various values of resistance in ohms of the various elements comprising the Wheatstone bridge circuit that we have employed in a concrete embodiment of the invention are tabulated below.

In our parent application, Serial No. 38,770, mentioned above, we disclosed a design of the bridge circuit such that $r_1 = r_2$ and $r_3 = r_4$. Although such a design is entirely satisfactory for the regulation of the elevator motor speed in accordance with the principles of our invention, the resistance losses in the bridge circuit were somewhat high. We have found that all of the regulating advantages of the system of our parent application may be retained, and the further advantage secured of minimizing the losses of the bridge circuit if the bridge resistors are proportioned so that $$\frac{r_1}{r_2} = \frac{r_3}{r_4}$$

When the latter relationship is employed, the total value of resistance losses in the bridge circuit may be made large or small, depending upon the numerical values chosen, without effect upon the regulating action. Accordingly, we prefer to design the bridge circuit in accordance with the latter relationship, and to use numerical values such as to provide low resistance losses or even minimum loss.

In the appended claims, the term "balanced Wheatstone bridge circuit" is used to denote a bridge in the sense that the ratio of two adjacent impedances is equal to the ratio of the two remaining impedances, whether or not any of the impedances are equal.

The currents flowing through the various branches are indicated by arrows to which the reference characters $I_1$, $I_2$, $I_3$ and $I_4$ are applied, as indicated. In Fig. 9 of the drawings, the resistance of the generator-armature Ga is indicated by the resistor $r_5$ and the corresponding resistance of the motor armature Ma is indicated by the resistor $r_7$.

In order to show that the current flowing through the generator field winding Gf in one of the arms of the bridge circuit may be independently changed by altering either the control voltage or the voltage supplied by the regulator-generator R, the following derivation for the current flowing through this winding is set forth, with reference to Fig. 8 of the drawings, based on the assumption that the relationship of resistances in the bridge circuit is such that $$\frac{r_1}{r_2} = \frac{r_3}{r_4}$$

Adding voltages around the bridge circuit:

1. $E_s = I_1 r_1 + I_3 r_3$ and $I_1 = \dfrac{E_s - I_3 r_3}{r_1}$

2. $E_R = I_3 r_3 - I_4 r_4$ and $I_4 = \dfrac{I_3 r_3 - E_R}{r_4}$

3. $E_s = I_2 r_2 - E_R + I_3 r_3$ and $I_2 = \dfrac{E_s + E_R - I_3 r_3}{r_2}$

Adding currents at the upper and lower junctions of the bridge circuit:

4. $I_1 + I_2 = I_3 + I_4$ and $I_3 = I_1 + I_2 - I_4$

Substituting values of $I_1$, $I_2$ and $I_4$ from Equations 1 to 3 in Equation 4.

5. $I_3 = \dfrac{E_s - I_3 r_3}{r_1} + \dfrac{E_s + E_R - I_3 r_3}{r_2} - \dfrac{I_3 r_3 - E_R}{r_4}$ Multiplying 5 out and collecting terms:

6. $I_3 = \dfrac{E_s r_4 (r_1 + r_2)}{r_1 r_2 r_4 + r_2 r_3 r_4 + r_1 r_3 r_4 + r_1 r_2 r_3} + \dfrac{E_R r_1 (r_2 + r_3)}{r_1 r_2 r_4 + r_2 r_3 r_4 + r_1 r_3 r_4 + r_1 r_2 r_3}$ Equation 6 may be simplified by using the assumption mentioned above, that $$\frac{r_1}{r_2} \text{ equals } \frac{r_3}{r_4}$$

From this relationship, $r_1 r_4$ equals $r_2 r_3$. The last term ($r_1 r_2 r_3$) in the denominator of the $E_s$ term of Equation 6 may accordingly be rewritten as $r_1^2 r_4$. Similarly the second term ($r_2 r_3 r_4$) in the denominator of $E_R$ term of Equation 6 may be written as $r_1 r_4^2$. Making these substitutions, Equation 6 becomes 7. $I_3 = \dfrac{E_s r_4(r_1+r_2)}{r_1 r_2 r_4 + r_2 r_3 r_4 + r_1 r_3 r_4 + r_1^2 r_4} + \dfrac{E_R r_1(r_2+r_3)}{r_1 r_2 r_4 + r_1 r_4^2 + r_1 r_3 r_4 + r_1 r_2 r_3}$ Rearranging denominator terms and factoring, Equation 7 becomes $I_3 = \dfrac{E_s r_4(r_1+r_2)}{r_4(r_1+r_2)(r_1+r_3)} + \dfrac{E_R r_1(r_2+r_4)}{r_1(r_2+r_4)(r_3+r_4)}$ which reduces to 8. $I_3 = \dfrac{E_R}{r_3+r_4} + \dfrac{E_s}{r_1+r_3}$ It will now be observed that either the control voltage $E_s$ or the regulator voltage $E_R$ may be altered to independently effect changes in the current $I_3$ flowing through the generator field winding $G_f$.

It is desirable, as set forth hereinbefore, to maintain a predetermined relationship between the speed of the motor M and the setting of the controller as represented by the control voltage $E_s$ regardless of the variable characteristics of the system or the direction of travel of the elevator car. The regulator-generator R serves as an automatic compensator to effect this desired relationship. When it is employed there is a constant relation between the speed of the elevator car or the motor M and the applied control voltage, which relation, due to the regulator-generator R, is unaffected by the variable characteristics of the system. This relationship will be shown in the derivation which follows, reference being had to Figs. 8 and 9 of the drawings.

The voltages generated by the regulator-generator, when the field windings are individually excited, may be represented by the following equations:

9. Voltage due to excitation of regulator series field winding $R_s = k_1 I_{RS}$ 10. Voltage due to excitation of regulator main field winding $R_f = k_3 I_{Rf}$ 11. Voltage due to excitation of regulator differential field winding $R_d = k_3 I_{Rd}$ The constants, $k_1$, $k_2$ and $k_3$ are obtained from the magnetization curves of the regulator-generator R, when it is individually excited by the various field windings.

The voltage $E_R$ generated by the regulator armature $R_a$ equals the sum of the individual voltages generated by the three field windings when they are simultaneously energized. It will be recalled that the flux generated by the shunt field winding $R_f$ opposes the flux generated by the field windings $R_s$ and $R_d$. The regulator armature voltage $E_R$ may, accordingly, (neglecting saturation) be represented by the following equation:

12. $E_R = k_1 I_{RS} - k_2 I_{Rf} + k_3 I_{Rd}$

We have found that it is desirable to make the sum of the resistances $r_3$ and $r_4$ of the two lower legs of the bridge equal to the constant $k_3$. Employing this relationship and noting that $I_3$ is identical with $I_{Rd}$, Equation 8 may be rewritten as follows:

13. $E_R = k_3 I_{Rd} - E_s \dfrac{k_3}{r_1+r_2}$

The current through the shunt field winding $R_f$ of the regulator generator may be represented by the following equation:

14. $I_{Rf} = \dfrac{E_G - r_5 I_{RS}}{r_6 + R_f}$

Substituting Equations 13 and 14 in 12 to eliminate $E_R$ and $I_{Rd}$

15. $k_3 I_{Rd} - E_s \dfrac{k_3}{r_1+r_2} = k_1 I_{RS} - k_2 \dfrac{E_G - r_5 I_{RS}}{r_6 + R_f} + k_3 I_{Rd}$ Solving 15 for $E_G$:

16. $E_G = E_s \dfrac{k_3(r_6+R_f)}{k_2(r_1+r_2)} + \dfrac{k_1}{k_2} I_{RS}(r_6+R_f) + r_5 I_{RS}$ Employing the above relationships and the characteristics of known machines, a typical set of constants for an average elevator installation has been calculated and is tabulated below:

$r_1 = 73$ ohms  $R_f = 727$ ohms
$r_2 = 66$ ohms  $R_d = 5.9$ ohms
$r_3 = 89.9$ ohms  $G_f = 84$ ohms
$r_4 = 81.1$ ohms  $k_1 = .193$ volt per ampere
$r_5 = .046$ ohm  $k_2 = 1710$ volts per ampere
$r_6 = 423$ ohms  $k_3 = 171$ volts per ampere
$r_7 = .13$ ohm Substituting the appropriate values in 16

17. $E_G = .71 E_s + .176 I_s$

Since the resistance of the regulator series field winding $R_s$ is negligible and the current flowing through the main field winding $R_f$ is also negligible as compared to the current flowing to the motor M, both of these values may be neglected and the counter E. M. F. of the motor M, or its speed with constant excitation may be represented as:

18. $E_m = E_G - I_{RS}(r_5+r_7)$

Substituting the appropriate values of $r_5$ and $r_7$,

19. $E_m = E_G - .176 I_{RS}$

Combining 17 and 19

20. $E_m = .71 E_s$

Equation 20 shows that the speed of the motor M, as represented by its counter E. M. F., or the speed of the elevator car will always be directly proportional to the control voltage $E_s$ regardless of the variable characteristics in the operation of the system.

In describing the operation of the system shown in Fig. 4 of the drawings, it will be assumed that the conductors L1 and L2 have applied thereto a suitable control voltage; that the generator G and the regulator-generator R are being operated at the proper speed; and that it is desired to move the elevator car 10 in the up direction. The operator then moves the master switch MS to the up position to effect the energization of the operating winding of the up reversing switch U, as well as the energization of the operating winding of the auxiliary switch X. The circuit for effecting the energization of these windings may be traced as follows:

L1, MS, up contacts, F1, U, X, gate contact, door contacts, L2

At contact members U5, a holding circuit is provided around the master switch MS. The brake B is released by the energization of the brake winding Bw in response to the operation of the up reversing switch U. The circuit for releasing the brake winding may be traced as follows:

L1, Bw, U1, L2

The potentiometer P1 is connected directly across the conductors L1 and L2 on the closure of contact members U2 and U3 in response to the operation of the up reversing switch U. Current is then caused to flow through the main generator field winding Gf in part because of the voltage which is obtained from the first section of the potentiometer P1, due to the fact that contact members C1 are closed, and in part because of the voltage which is obtained from the armature Ra of the regulator-generator R.

The operating winding of the speed relay V is energized in response to the operation of the up reversing switch U over a circuit which may be traced as follows:

L1, U4, E1, V, L2

As a result of the energization of the speed relay V, a circuit is completed for energizing the armature CMa of the control motor CM. This circuit may be traced as follows:

L1, V2, CMa, V3, C10, L2

The contact members C1 are then opened and the remaining contact members C2 through C7 are successively closed and opened, contact members C8 being closed but not opened, thereby increasing the voltage which is applied to the main generator field winding Gf to correspondingly increase the voltage which is applied to the armature Ma of the motor M. As soon as the contact members C10 are opened, the armature CMa is deenergized, contact members C8 remaining closed. A further result of the operation of the speed relay V is to open contact members V1, thereby inserting the resistor Ar entirely in series circuit relation with the armature Ra. Depending upon the operating conditions as set forth hereinbefore, it may in some instances be desirable to provide the contact members V1 in the normally open condition and to close them on operation of the system at full speed.

As has been set forth hereinbefore, it is desirable that speed of the motor M be at a certain value for each of the steps of control voltage obtained from the potentiometer P1. It is then possible to obtain a smooth acceleration curve which will be unaffected by the many variables in the system that have been set forth in detail hereinbefore. In addition, it is also desired that the same speed relationship exist when the contact members C1 through C8 are operated in a reverse order to effect the deceleration of the motor M and the elevator car driven thereby.

We have found that the desired speed relationship will exist regardless of the variable characteristics of the elevator system, or the connections to the potentiometer P1, when the regulator-generator R is employed and its field windings are connected as shown in conjunction with the balanced Wheatstone bridge circuit. Because of the connection of the shunt field winding Rf in series circuit relation with the main generator field winding Gf in one of the branches of the bridge circuit, the changes which are introduced to effect a corrective action through the generator G are immediately reflected in the voltage which is generated in the armature Ra of the regulator-generator. As a result, the corrective effect which is applied by the regulator-generator R is, in a sense, proportional to the degree of variation in the speed of the motor M from the desired speed.

When it is desired to stop the elevator car at a particular floor, the operator centers the master switch, thereby completing a circuit for energizing the operating winding of the slowdown inductor relay E. This circuit may be traced as follows:

L1, MS, stop contacts, E, X1, L2.

As soon as the contact members E1 come into proximity with the up inductor plate UE, they are opened and the previously traced energizing circuit for the operating winding of the speed relay V is interrupted. Contact members V1 and V4 are accordingly reclosed to effect energization of the armature of the control motor CMa in reverse direction to effect the operation of the contact members C1 through C8 in a reverse sequence. The circuit for now energizing the control motor armature CMa may be traced as follows:

L1, V4, CMa, V1, C9, L2.

The contact members C7 through C2 are successively closed and opened to effect a decrease in the flow of current through the main generator field winding Gf. During this interval the regulator-generator R is effective to maintain the speed of the motor M at values corresponding to the contact members which are closed. As a result, regardless of the variable conditions or loading of the elevator system, or the connections to the potentiometer P1, the elevator car 10 will be decelerated in accordance with a deceleration pattern determined by the resistance values between the contacts C1C2, etc. and by the relative angular positions of the corresponding cams.

A further result of the deenergization of the speed relay V is to close contact members V5 and to complete an obvious energizing circuit for the operating winding of the landing inductor relay F in parallel with the operating winding of the slowdown inductor relay E. As soon as contact members F1 come into proximity with the up inductor plate UF, the previously traced energizing circuit for the operating winding of the up reversing switch U and the auxiliary switch X, is interrupted. These switches are deenergized. The potentiometer P1 is disconnected from the conductors L1 and L2 and the previously traced energizing circuit for the brake winding Bw is opened. The brake B is then applied and the elevator car 10 is brought to rest at the desired floor.

In order to further point out the application of our invention, reference may be had to the circuits shown in Fig. 5 of the drawings. The circuit connections there shown are identical with those shown in Fig. 4, with the exception that the potentiometer P1 and the control motor CM are omitted. Also, the speed relay V is arranged to short circuit an accelerating resistor Ar which is connected in series circuit relation with the bridge circuit to permit the operation of the motor M to full speed in one step.

As shown in Fig. 5 of the drawings, the armature Ra of the regulator-generator is connected across two of the terminals of a Wheatstone bridge, as set forth hereinbefore, one leg of which comprises the differential field winding Rd of the regulator-generator, and the main field winding Gf of the generator G. The remaining legs of the Wheatstone bridge comprise resistors $r_1$, $r_2$ and $r_4$. The terminals of the Wheatstone bridge not connected to the armature Ra are arranged to be connected to the conductors L1 and L2 through the accelerating resistor Ar, and these connections may be reversed by means of the up and down reversing switches U and D.

Since the sequence of operation of the system shown in Fig. 5 of the drawings is somewhat similar to that set forth hereinbefore in connection with Fig. 4, only the portion necessary to illustrate the function of the Wheatstone bridge will now be set forth. As soon as the master switch MS is operated, to the up position for example, contact members U2 and U3 are closed to connect the Wheatstone bridge in series circuit relation with the accelerating resistor Ar and across the conductors L1 and L2. The brake winding Bw is energized to release the brake B and the motor M is then energized to move the elevator car in the up direction. The voltage which is applied to the main generator field winding Gf of the generator G is then a function of the voltage existing across the conductors L1 and L2, less the voltage which is consumed in the accelerating resistor Ar, and is further proportional to the voltage which is generated in the armature Ra of the regulator-generator. As is set forth hereinbefore, the voltage which is generated by the armature Ra may be independently applied to the generator field winding Gf and this effect will be entirely independent of the effect which is caused by the voltage which is applied thereto from the source represented by the conductors L1 and L2.

When the speed relay V is energized, contact members V1 are closed to short circuit the accelerating resistor Ar. The Wheatstone bridge circuit is then connected directly across the conductors L1 and L2. The regulator-generator R then functions to maintain the proper current in the generator field winding Gf, so that the motor M will operate at a fixed speed regardless of the load or variable conditions affecting it.

Since certain further changes may be made in the foregoing constructions and different embodiments of the invention may be made without departing from the scope thereof, it is intended that all matter shown in the accompanying drawings or set forth in the foregoing description shall be interpreted as illustrative and not in a limiting sense.

We claim as our invention:

1. In a system for controlling the functioning of an electrical device, in combination, a Wheatstone bridge circuit including said device in one of the branches thereof, means for connecting one control source between opposite terminals of said bridge circuit, means for connecting another control source between the remaining pair of terminals of said bridge circuit, and means for altering the effect of one control source to effect a change in the functioning of said device without altering the effect of the other source in the functioning of said device.

2. In a system for controlling the functioning of an electrical device, in combination, a balanced Wheatstone bridge circuit including said device in one of the branches thereof, means for connecting one control source between opposite terminals of said bridge circuit, means for connecting another control source between the remaining pair of terminals of said bridge circuit, and means for altering the effect of either control source to effect a change in the functioning of said device without altering the effect of the other source in the functioning of said device.

3. In a system for controlling the functioning of an electrical device, in combination, a Wheatstone bridge circuit including said device in one of the branches thereof, means for connecting one control source between opposite terminals of said bridge circuit, means for connecting another control source between the remaining pair of terminals of said bridge circuit, and means responsive to the combined effects of said control sources for controlling the functioning of said second control source.

4. In a system for controlling the functioning of an electrical device, in combination, a Wheatstone bridge circuit includng said device in one of the branches thereof, means for connecting one control source between opposite terminals of said bridge circuit, means for connecting another control source between the remaining pair of terminals of said bridge circuit, means for independently altering the effect of each of said control sources to independently effect corresponding changes in the functioning of said device, and means responsive to the combined effects of said control sources for controlling the functioning of said second control source.

5. In a system for controlling the functioning of an electrical device, in combination, a balanced Wheatstone bridge circuit including said device in one of the branches thereof, means for connecting one control source between opposite terminals of said bridge circuit, means for connecting another control source between the remaining pair of terminals of said bridge circuit, and means responsive to the combined effects of said control sources for controlling the functioning of said second control source.

6. In a system for controlling the functioning of an electrical device, in combination, a balanced Wheatstone bridge circuit including said device in one of the branches thereof, means for connecting one control source between opposite terminals of said bridge circuit, means for connecting another control source between the remaining pair of terminals of said bridge circuit, means for independently altering the effect of each of said control sourcs to independently effect corresponding changes in the functioning of said device, and means responsive to the combined effects of said control sources for controlling the functioning of said second control source.

7. In a system for controlling the functioning of an electrical device, in combination, a balanced Wheatstone bridge circuit including said device in one of the branches thereof, means for connecting one control source between one pair of opposite terminals of said bridge circuit, means for connecting another control source comprising the armature of a generator between the remaining pair of terminals of said bridge circuit, means for controlling the voltage generated by said armature, and means responsive to the combined effects of said control sources for also controlling the voltage generated by said armature.

8. In a system for controlling the functioning of an electrical device, in combination, a balanced Wheatstone bridge circuit including said device in one of the branches thereof, means for connecting one control source between one pair of opposite terminals of said bridge circuit, means for connecting another control source comprising the armature of a generator between the remaining pair of terminals of said bridge circuit, means for controlling the voltage generated by said armature, and a field winding in said generator connected to be responsive to the current flowing through said device for also controlling the voltage generated by said armature.

9. In a system for controlling the functioning of an electrical device, in combination, a balanced Wheatstone bridge circuit including said device in one of the branches thereof, means for connecting a variable control source between one pair of opposite terminals of said bridge circuit, means for connecting another control source comprising the armature of a generator between the remaining pair of terminals of said bridge circuit, means for variably controlling the voltage generated by said armature, and a field winding in said generator connected in series circuit relation with said device for opposing the functioning of said last-named means in controlling the voltage generated by said armature, whereby the current flowing through said device is independently a function of the variable voltage from said variable control source and the voltage generated by said armature.

10. In a system for controlling the functioning of an electrical device, in combination, a pair of circuits disposed to be connected to a first control source, said device being connected in one of said circuits; means for connecting a second control source from a point of given potential in one of said circuits to a point of substantially equal potential in the other of said circuits, and means for varying the potential of one of said sources to vary the current flowing in said device.

11. In a system for controlling the functioning of an electrical device, in combination, a pair of circuits disposed to be connected to a first control source, said device being connected in one of said circuits; means for connecting a second control source from a point of given potential in one of said circuits to a point of substantially equal potential in the other of said circuits, means for varying the potential of said first source and additional means for varying the potential of said second source.

12. In a system for controlling the functioning of an electrical device, the combination, a Wheatstone bridge circuit with variable potential sources connected across the diagonals of said bridge, one of the legs of said bridge comprising said device, the resistance of the legs of said bridge being so proportioned that the resistance of the leg containing said device divided by the resistance of either adjacent leg substantially equals the resistance of the other adjacent leg divided by the resistance of the leg opposite.

13. In a system for controlling the functioning of an electrical device, the combination, a Wheatstone bridge circuit with variable potential sources connected across the diagonals of said bridge, one of the legs of said bridge comprising said device, the resistance of the legs of said bridge being so proportioned that the resistance of the leg containing said device divided by the resistance of either adjacent leg substantially equals the resistance of the other adjacent leg divided by the resistance of the leg opposite, whereby varying either source varies its effect on said device without altering the effect of the other source on said device.

14. In a system for controlling the functioning of an electrical device, the combination, a Wheatstone bridge circuit with variable potential sources connected across the diagonals of said bridge, one of said sources comprising the armature of a generator and one of the legs of said bridge having connected in circuit a field in said generator, the resistance of said leg plus the resistance of the adjacent leg that is in series circuit relation with said armature and said field substantially equalling numerically the volts generated by said armature with one ampere of current flowing in said field.

15. In a system for controlling the voltage of the armature of a generator, in combination, a Wheatstone bridge circuit with variable potential sources connected across the diagonals of said bridge one of said sources comprising the armature of a second generator, and one of the legs of said bridge comprising a field winding of said first mentioned generator and a field winding of said second generator in series circuit relation, the resistance of said field containing leg plus the resistance of the adjacent leg that is in series circuit relation with the armature of said second generator and the leg containing said fields substantially equalling numerically the volts generated by the armature of said second generator with one ampere of current flowing in the said field of said generator, and the resistance of the legs of said bridge being so proportioned that the resistance of the leg containing said fields divided by the said adjacent series circuit leg equals the resistance of the other leg adjacent to the field containing leg divided by the resistance of the leg opposite said fields.

16. In a system for controlling the voltage of the armature of a generator, in combination, a Wheatstone bridge circuit with variable potential sources connected across the diagonals of said bridge one of said sources comprising the armature of a second generator, and one of the legs of said bridge comprising a field winding of said first mentioned generator and a field winding of said second generator in series circuit relation, the resistance of said field containing leg plus the resistance of the adjacent leg that is in series circuit relation with the armature of said second generator and the leg containing said fields substantially equalling numerically the volts generated by the armature of said second generator with one ampere of current flowing in the said field of said generator, and the resistance of the legs of said bridge being so proportioned that the resistance of the leg containing said fields divided by the said adjacent series circuit leg equals the resistance of the other leg adjacent to the field containing leg divided by the resistance of the leg opposite said fields and a second field in said second generator connected across the armature of said first mentioned generator.

17. In a system for controlling the voltage of the armature of a generator, in combination, a Wheatstone bridge circuit with variable potential sources connected across the diagonals of said bridge one of said sources comprising the armature of a second generator, and one of the legs of said bridge comprising a field winding of said first mentioned generator and a field winding of said second generator in series circuit relation, the resistance of said field containing leg plus the resistance of the adjacent leg that is in series circuit relation with the armature of said second generator and the leg containing said fields substantially equalling numerically the volts generated by the armature of said second generator with one ampere of current flowing in the said field of said generator, and the resistance of the legs of said bridge being so proportioned that the resistance of the leg containing said fields divided by the said adjacent series circuit leg equals the resistance of the other leg adjacent to the field containing leg divided by the resistance of the leg opposite said fields and a second field in said second generator connected across the armature of said first mentioned generator, said second field being so connected that its ampere turns oppose those of the first mentioned field of said second generator.

DANILO SANTINI.
KENNETH MARTIN WHITE.